US012785483B2

(12) United States Patent
Roll

(10) Patent No.: US 12,785,483 B2
(45) Date of Patent: Nov. 3, 2026

(54) STATOR FOR AN ELECTRIC MACHINE HAVING STATOR SLOTS FOR A STATOR WINDING, IT BEING POSSIBLE FOR A COOLING FLUID TO FLOW THROUGH AT LEAST ONE OF THE STATOR SLOTS

(71) Applicant: Schaeffler Technologies AG & Co. KG, Herzogenaurach (DE)

(72) Inventor: Marcel Roll, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 211 days.

(21) Appl. No.: 18/719,592

(22) PCT Filed: Nov. 14, 2022

(86) PCT No.: PCT/DE2022/100845

§ 371 (c)(1),
(2) Date: Jun. 13, 2024

(87) PCT Pub. No.: WO2023/110002

PCT Pub. Date: Jun. 22, 2023

(65) Prior Publication Data

US 2025/0062651 A1 Feb. 20, 2025

(30) Foreign Application Priority Data

Dec. 14, 2021 (DE) ......................... 102021133029.7

(51) Int. Cl.
*H02K 3/24* (2006.01)

(52) U.S. Cl.
CPC ...................................... *H02K 3/24* (2013.01)

(58) Field of Classification Search
CPC ........ H02K 3/24; H02K 2213/03; H02K 1/20; H02K 3/14
See application file for complete search history.

(56) References Cited

U.S. PATENT DOCUMENTS 1,448,700 A 3/1923 Seidner
2,727,161 A 12/1955 William et al.
(Continued)

FOREIGN PATENT DOCUMENTS

DE 102015013018 A1 4/2017
DE 102019115489 A1 12/2020
(Continued)

OTHER PUBLICATIONS

Erik Schneider, Frank Fickle, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles] German automotive magazine ATZ, vol. 113, May 2011, pp. 66-72.
(Continued)

*Primary Examiner* — Thomas Truong
(74) *Attorney, Agent, or Firm* — Volpe Koenig

(57) ABSTRACT

A stator, comprising a stator body with a plurality of stator teeth arranged distributed over the periphery and stator slots formed between the stator teeth and extending through the stator body in the axial direction, wherein a stator winding with a plurality of electrical conductors is arranged in the stator slots, and the stator slots have a slot base at their radially outer end along their radial extent and a slot opening at their radially inner end, and the electrical conductors of the stator winding have a width and a height in cross section, wherein the width is greater than the height, and the electrical conductors are arranged in the stator slots in such a way that their width extends in the circumferential direction and their height extends in the radial direction in the stator slots, it being possible for a cooling fluid to flow through at least one of the stator slots.

18 Claims, 3 Drawing Sheets

(56) References Cited

U.S. PATENT DOCUMENTS

| | | | | |
|---|---|---|---|---|
| 2005/0189835 A1* | 9/2005 | Drubel | ..................... | H02K 3/24 310/214 |
| 2010/0026132 A1* | 2/2010 | Ooiwa | ..................... | H02K 3/12 310/201 |
| 2021/0175764 A1 | 6/2021 | Ramet et al. | | |
| 2022/0216743 A1* | 7/2022 | Leonardi | .................. | H02K 1/20 |

FOREIGN PATENT DOCUMENTS

| | | | |
|---|---|---|---|
| DE | 102020204233 | A1 | 10/2021 |
| EP | 3157138 | A1 | 4/2017 |
| JP | 2010041795 | A | 2/2010 |
| JP | 2020127316 | A | 8/2020 |

OTHER PUBLICATIONS

Markus Schiefer: Indirekte Wicklungskühlung von hochausgenutzten permanenterregten Synchronmaschinen mit Zahnspulenwicklung [Indirect Winding Cooling of Highly Utilized Permanently Excited Synchronous Machines with Toothed Coil Winding], dissertation, Karlsruhe Institute of Technology (KIT), 2017.

* cited by examiner

STATOR FOR AN ELECTRIC MACHINE HAVING STATOR SLOTS FOR A STATOR WINDING, IT BEING POSSIBLE FOR A COOLING FLUID TO FLOW THROUGH AT LEAST ONE OF THE STATOR SLOTS

CROSS-REFERENCE TO RELATED APPLICATIONS

This application is the U.S. National Phase of PCT Appln. No. PCT/DE2022/100845, filed Nov. 14, 2022, which claims the benefit of German Patent Appln. No. 102021133029.7, filed Dec. 14, 2021, the entire disclosures of which are incorporated by reference herein.

TECHNICAL FIELD

The present disclosure relates to a stator for an electric machine, comprising a stator body with a plurality of stator teeth arranged over the periphery in a distributed manner and stator slots formed between the stator teeth and extending in the axial direction through the stator body, wherein a stator winding with a plurality of electrical conductors is arranged in the stator slots, and the stator slots along the radial extension thereof have a slot base at the radially outer end thereof and a slot opening at the radially inner end thereof, or the stator slots along the radial extension thereof have a slot base at the radially inner end thereof and a slot opening at the radially outer end thereof, the electrical conductors of the stator winding have a width and a height in cross section, wherein the width is greater than the height, and the electrical conductors are arranged in the stator slots such that the width thereof extends in the circumferential direction and the height thereof extends in the radial direction in the stator slots, wherein a cooling fluid can flow through at least one, preferably all, of the stator slots.

BACKGROUND

Electric motors are increasingly being used to drive motor vehicles in order to provide alternatives to internal combustion engines, which require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, May 2011, pages 66-72 by Erik Schneider, Frank Fickle, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles]. This article describes a drive unit for an axle of a vehicle which comprises an electric motor that is arranged so as to be concentric and coaxial with respect to a bevel gear differential, a switchable 2-speed planetary gear set being arranged in the drive train between the electric motor and the bevel gear differential and likewise positioned to be coaxial with the electric motor and the bevel gear differential or spur gear differential. The drive unit is very compact and allows for a good compromise between climbing ability, acceleration and energy consumption due to the switchable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable, for example in urban areas, a purely electric mode of operation while at the same time permitting both sufficient range and availability, in particular when driving cross-country. In addition, it is also possible to use the internal combustion engine and the electric motor at the same time for drive in certain operating situations.

In the development of electric machines intended for e-axles or hybrid modules, there is a continuing need to increase their power densities, so the cooling of electric machines required for this is growing in importance. Owing to the necessary cooling capacities, hydraulic fluids such as cooling oils have become established in most concepts for the removal of heat from the thermally loaded regions of an electric machine.

Jacket cooling as well as winding head cooling are known, for example, from the prior art for cooling electric machines by means of hydraulic fluids. While jacket cooling transfers the heat generated at the outer surface of the stator laminated core into a cooling circuit, the heat transfer takes place in the case of the winding head cooling immediately at the conductors outside the stator laminated core in the region of the winding heads into the fluid.

Further improvements are provided by separate cooling channels, which are introduced both in the stator laminated core (see, for example, EP3157138 A1) and in the slot, in addition to the conductors (see, for example, Markus Schiefer: Indirekte Wicklungskühlung von hochausgenutzten permanenterregten Synchronmaschinen mit Zahnspulenwicklung [Indirect Winding Cooling of Highly Utilized Permanently Excited Synchronous Machines with Toothed Coil Winding], dissertation, Karlsruhe Institute of Technology (KIT), 2017).

Concepts are also known in which hydraulic fluid flows directly around the windings in order to increase the power density. Improved cooling with direct contact of the hydraulic fluid and conductor in the slot is already known per se from the prior art. For example, DE102015013018 A1 describes a solution for electric machines with single-tooth winding, wherein the fluid flows directly around the windings, which are wound around the teeth.

SUMMARY

The object of the disclosure is therefore to provide a stator with improved and in particular cost-effectively producible slot cooling.

This object is achieved by a stator for an electric machine, comprising a stator body with a plurality of stator teeth arranged over the periphery in a distributed manner and stator slots formed between the stator teeth and extending in the axial direction through the stator body, wherein a stator winding with a plurality of electrical conductors is arranged in the stator slots, and the stator slots along the radial extension thereof have a slot base at the radially outer end thereof and a slot opening at the radially inner end thereof, or the stator slots along the radial extension thereof have a slot base at the radially inner end thereof and a slot opening at the radially outer end thereof, and the electrical conductors of the stator winding have a width and a height in cross section, wherein the width is greater than the height, and the electrical conductors are arranged in the stator slots such that the width thereof extends in the circumferential direction and the height thereof extends in the radial direction in the stator slots, wherein a cooling fluid can flow through at least one, preferably all, of the stator slots, wherein at least one of the electrical conductors is arranged in at least one of the stator slots through which the cooling fluid can flow such that at least in sections its width extends in the radial direction and its height extends in the circumferential direction in the corresponding stator slot.

This has the advantage that flow channels which do not require any additional components or forms are generated within a stator slot in the immediate vicinity of the copper wires. The electrical conductors themselves are used to form the flow channels in that they are positioned in the stator slot in alternating cross-sectional orientation.

According to a first preferred embodiment of the disclosure, at least two electrical conductors are arranged to be rotated by 90° with respect to each in a stator slot, wherein the electrical conductors in their basic form particularly preferably have a rectangular cross section. Thus, the electrical conductor, which is arranged to be rotated by 90°, does not completely fill the stator slot in the circumferential direction and the remaining gap forms a flow channel for the cooling fluid in the stator slot. Most preferably, lugs that protrude into the stator slot in the circumferential direction can be formed in the laminated core, which prevent a displacement of the electrical conductors in the circumferential direction and can thus ensure a defined flow channel geometry during operation of the stator.

The stator according to the disclosure is preferably designed for use in a radial flux machine. A stator for a radial flux machine usually has a cylindrical structure and generally consists of electrical steel sheets that are electrically insulated from one another and are structured in layers and packed to form laminated cores. Distributed around the circumference, stator slots are embedded in the electrical steel sheet and arranged to run substantially parallel to the rotor shaft, said stator slots receiving the stator winding or parts of the stator winding. The stator slots preferably have a substantially U-shaped cross-sectional contour. Most preferably, the stator slots have straight slot walls extending in the radial direction.

Stator windings are embedded in the stator slots of the stator according to the disclosure. A stator winding is an electrically conductive conductor which has a longitudinal extension that is much greater than its diameter. The stator winding can generally have any cross-sectional shape. Rectangular cross-sectional shapes are preferred since these allow high packing densities and consequently high power densities to be achieved. Particularly preferably, a stator winding is formed of copper. Preferably, a stator winding has insulation. To insulate the stator winding, for example, mica paper, which for mechanical reasons can be reinforced by a glass fabric backing, may be wound in tape form around one or more stator windings, which are impregnated by means of a curing resin. In principle, it is also possible to use a curable lacquer layer without mica paper to insulate a stator winding.

The stator according to the disclosure also has a stator body. The stator body can be made in one piece or in multiple pieces, in particular in a segmented manner. A one-piece stator body is characterized by the fact that the entire stator body is formed in one piece as viewed over the periphery. The stator body is usually formed from a plurality of stacked laminated electrical steel sheets, each of the electrical steel sheets being closed to form a circular ring. A segmented stator body is characterized by the fact that it is constructed from individual stator segment parts. The stator body can be constructed from individual stator teeth or stator tooth groups, wherein each individual stator tooth or each individual stator tooth group can be formed from a plurality of stacked laminated electrical steel sheets, wherein each of the electrical sheets is designed as a stator segment lamination part.

The stator body is preferably formed from one or more stator laminated cores. A stator laminated core is understood to mean a plurality of laminated individual sheets or stator laminations, which are generally made from electrical steel sheets and are layered and packed one on top of the other to form a stack or what is referred to as a stator laminated core. The individual sheets can then remain held together in the laminated core by adhesive bonding, welding or screwing.

The stator teeth of the stator are preferably formed in the stator body. Stator teeth are components of the stator body which are designed as circumferentially spaced, tooth-like parts of the stator that are directed radially inward, with an air gap for the magnetic field being formed between the free ends of the stator teeth and a rotor body. The gap between the rotor and the stator is referred to as the air gap. In a radial flux machine, this is a substantially annular gap with a radial width that corresponds to the distance between the rotor body and the stator body.

In particular, the stator can be provided for use in an electric machine within a drive train of a motor vehicle. The electric machine is intended in particular for use within a drive train of a hybrid or fully electrically driven motor vehicle. In particular, the electric machine is dimensioned such that vehicle speeds of more than 50 km/h, preferably more than 80 km/h and in particular more than 100 km/h can be achieved. The electric machine particularly preferably has an output of more than 30 KW, preferably more than 50 KW and in particular more than 70 kW. Furthermore, it is preferred that the electric machine provides speeds greater than 5000 rpm, particularly preferably greater than 10,000 rpm, very particularly preferably greater than 12,500 rpm.

According to an advantageous embodiment of the disclosure, the plurality, preferably all, of the electrical conductors have a substantially rectangular contour in cross section. The advantage of this design is that electrical conductors that are generally available as standard can be used to form the stator winding, which is particularly favorable in terms of the manufacturing costs of the stator.

According to a further preferred development of the disclosure, the plurality, preferably all, of the electrical conductors have a substantially identical contour in cross section. This makes it possible to keep the component and manufacturing complexity of the stator low, which also contributes to cost-effective manufacturing processes.

Furthermore, according to a likewise advantageous embodiment of the disclosure, at least the one of the electrical conductors which is arranged in at least one of the stator slots such that its width extends in the radial direction and its height extends in the circumferential direction in the corresponding stator slot has a contour that changes over its axial extension through the stator slot. According to a further particularly preferred embodiment of the disclosure, it is possible in this context for the contour that changes over the axial extension through the stator slot to be caused by a torsion of the electrical conductor about its longitudinal axis. In principle, it may also be preferred that an electrical conductor is continuously twisted, i.e., that it has a kind of "thread", wherein four flow channels are created which rotate around the electrical conductor in axial extension. The electrical conductor can have either a rectangular or a square cross section. The flow channel cross sections can be directly influenced by the geometries of the electrical conductors.

Furthermore, the disclosure can also be further developed in such a way that at least the one of the electrical conductors which is arranged in at least one of the stator slots such that its width extends in the radial direction and its height extends in the circumferential direction in the corresponding stator slot is surrounded in the radial direction by electrical conductors, the width of each of which extends in the circumferential direction and the height of each of which extends in the radial direction in the stator slots, whereby a particularly advantageous winding pattern can be realized and particularly effective cooling of the electrical conductors in the stator slot can be achieved, which has also been shown by tests and simulations by the applicant.

In a likewise preferred embodiment of the disclosure, the electrical conductors have insulation on their outer lateral surfaces.

It may also be advantageous to further develop the disclosure such that the ratio of width to height of an electrical conductor is between 1.01:1 and 1.5:1. The applicant was able to demonstrate in tests and simulations that particularly efficient groove cooling can be achieved in a particularly simple manner within this ratio range.

According to a further preferred embodiment according to the disclosure, the electrical conductors are arranged substantially identically in a plurality, preferably in all, of the stator slots. This can contribute to a reduction in complexity in the production of the stator as far as possible.

Finally, the disclosure can also be advantageously designed such that an even number of a first group of electrical conductors is arranged in a plurality of the stator slots such that their width extends in the radial direction in each case and their height extends in the circumferential direction in each case in the corresponding stator slot, and an even number of a second group of electrical conductors is arranged in this plurality of stator slots such that their width extends in the circumferential direction in each case and their height extends in the radial direction in each case in the stator slots.

In a highly preferred embodiment of the disclosure, the stator winding is designed as a hairpin winding. In the case of an electrical conductor designed as a hairpin, as can be used in a hairpin winding, the rotation of the electrical conductors relative to one another can also have a beneficial effect on the winding head since in this case, as a rule, some deformations take place in the electrical conductor anyway, which can possibly be simplified by the additional shaping.

Finally, in this context, it may also be preferred that at least one hairpin of the hairpin winding has a first electrical conductor and a second electrical conductor parallel to the first electrical conductor with substantially identical cross-sectional contours, wherein the first electrical conductor is rotated relative to the second electrical conductor at least once by approximately 90° about the longitudinal axis of the first electrical conductor.

BRIEF DESCRIPTION OF THE DRAWINGS

The disclosure is explained in more detail below with reference to drawings without limiting the general concept of the disclosure.

In the drawings.

DETAILED DESCRIPTION

Figure 1:
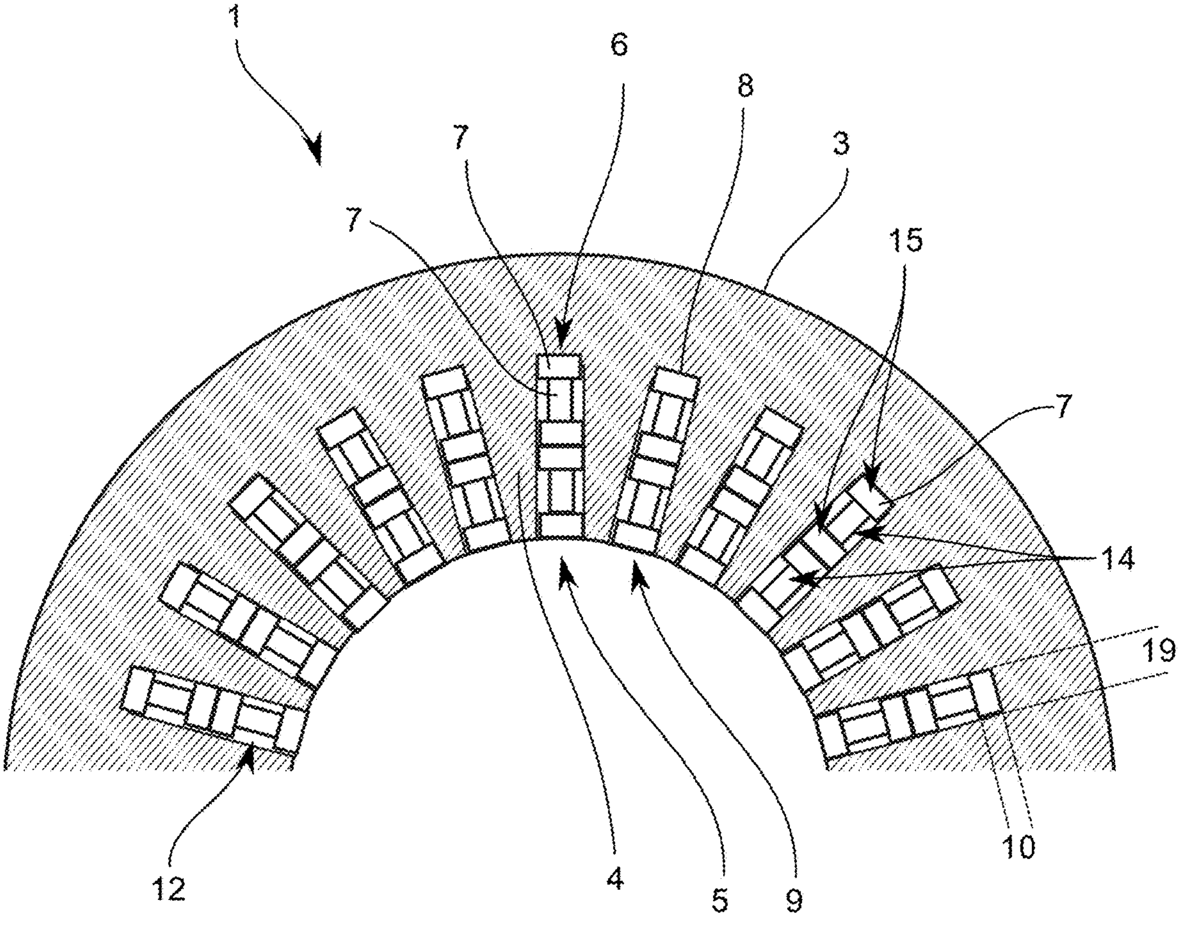
FIG. 1: shows a stator in cross-sectional view.

FIG. 1 shows a stator 1 for an electrical radial flux machine, comprising a stator body 3 with a plurality of stator teeth 4 arranged in a distributed manner over the periphery and stator slots 5 formed between the stator teeth 4 and extending in the axial direction through the stator body 3. A stator winding 6 with a plurality of electrical conductors 7 to which current can be supplied is arranged in the stator slots 5. The electrical conductors 7 have insulation 12 on their outer lateral surfaces, for example an insulating lacquer. The stator slots 5 are substantially U-shaped with straight, radially extending slot walls and a cooling fluid 12 can flow through them.

The stator 1 is designed for an internal rotor, so the stator slots 5 along their radial extension have a slot base 8 at their radially outer end and a slot opening 9 at their radially inner end. In principle, it would naturally also be conceivable for the stator 1 to be intended for an external rotor, in which case the stator slots 5 along their radial extension have a slot base 8 at their radially inner end and a slot opening 9 at their radially outer end, which, however, is not shown in the drawings.

The electrical conductors 7 of the stator winding 6 have a width 19 and height 10 in cross section, the width 19 being greater than the height 10, which can be clearly seen from FIG. 1. Some of the electrical conductors 7, such as the electrical conductors 7 resting on the slot base 8, are arranged in the stator slots 5 such that their width 19 extends in the circumferential direction and their height 10 extends in the radial direction in the stator slots 5.

In addition to these, electrical conductors 7 are also arranged in the stator slots 5 such that their width 19 extends in the radial direction and their height 10 in the circumferential direction in the corresponding stator slots 5. These define cooling channels for the cooling fluid 12, which run axially through the stator 1, with the stator slots 5 and the radially adjacent electrical conductors 7. The cooling fluid 12 allows the heat to be dissipated from the stator winding 6 or the stator slot 5.

The electrical conductors 7 all have a substantially identical rectangular contour in cross section. The ratio of the width 19 to the height 10 of a rectangular electrical conductor 7 is between 1.01:1 and 1.5:1 in the embodiment shown according to the disclosure. In the embodiment of FIG. 1, one of the electrical conductors 7, which is arranged in one of the stator slots 5 such that its width 19 extends in the radial direction and its height 10 in the circumferential direction in the corresponding stator slot 5 is surrounded in the radial direction by electrical conductors 7, the width 19 of each of which extends in the circumferential direction and the height 10 of each of which extends in the radial direction in the stator slots 5. This results in three radially consecutive electrical conductors 7 in each case forming a double-T-like contour in cross section. It is also clear from FIG. 1 that the electrical conductors 7 are arranged in a substantially identical manner in all stator slots 5, i.e., two double-T-like groups of electrical conductors 7 are positioned radially one above the other in a stator slot 5.

In this case, an even number of a first group 14 of electrical conductors 7 is arranged in the stator slots 5 such that their width 19 extends in each case in the radial direction and their height 10 extends in each case in the circumferential direction in the corresponding stator slot 5, and an even number of a second group 15 of electrical conductors 7 is arranged in these stator slots 5 such that their width 19 extends in each case in the circumferential direction and their height 10 extends in each case in the radial direction in the stator slots 5. This even number is particularly advantageous when using hairpin winding.

Figure 2:
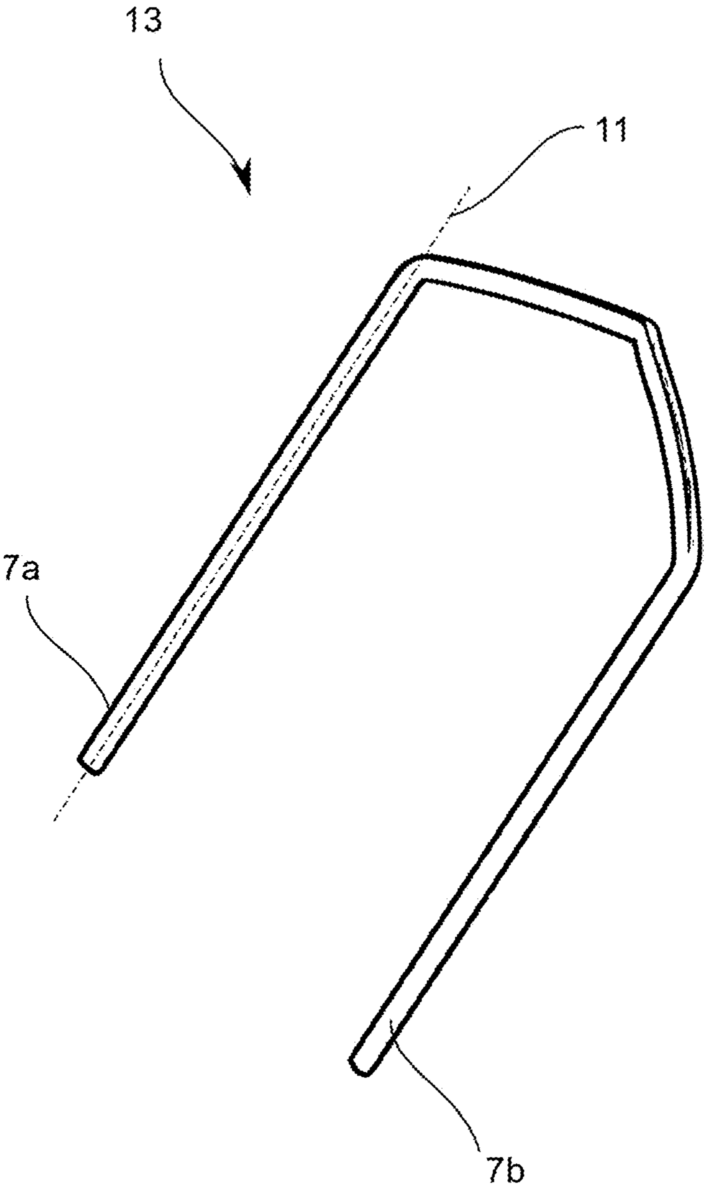
FIG. 2 shows a hairpin in a perspective representation.

The stator winding 6 known from FIG. 1 is designed as a hairpin winding 16. A hairpin 13 of this hairpin winding 16 is shown in FIG. 2. The hairpin 13 comprises a first electrical conductor 7*a* and a second electrical conductor 7*b* parallel to the first electrical conductor 7*a* with substantially identical cross-sectional contours.

Figure 3:
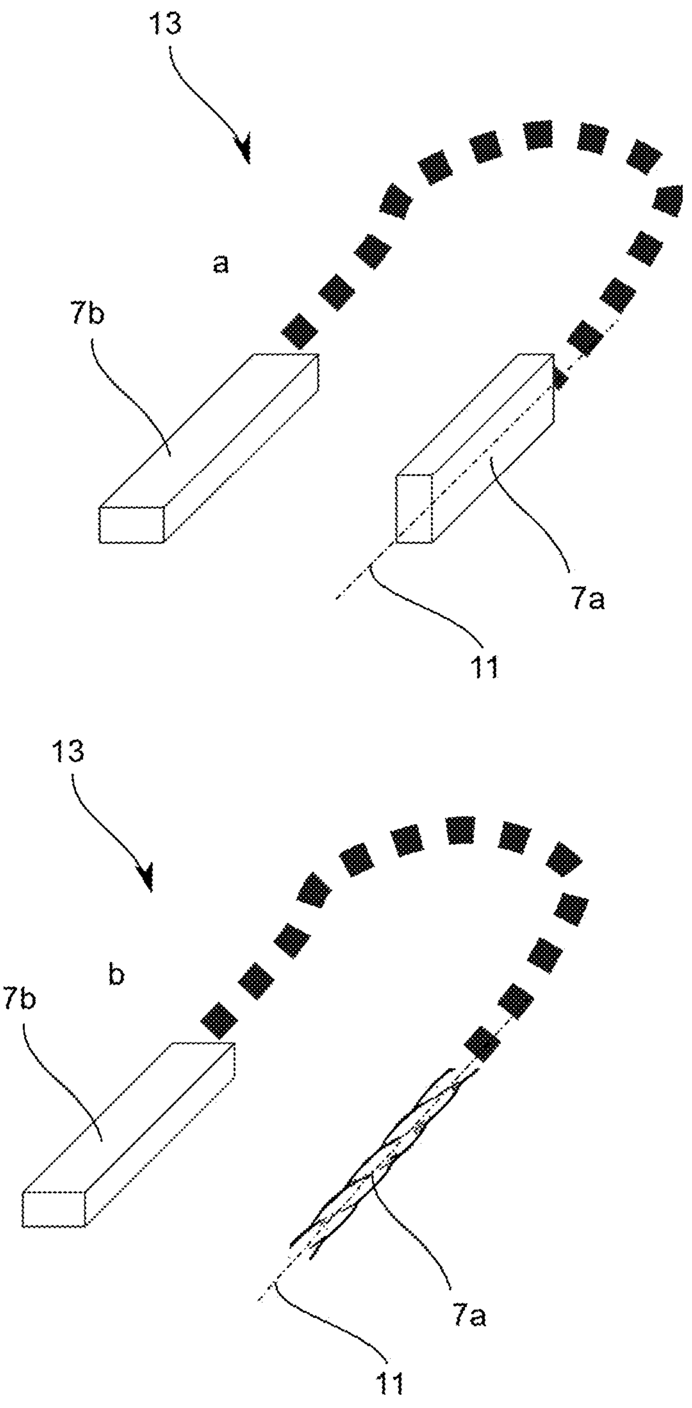
FIG. 3 shows a hairpin with two electrical conductors rotated relative to each other and a hairpin with a twisted electrical conductor in perspective, schematic representations.

As shown in FIG. 3, the top illustration, the first electrical conductor 7*a* in a first embodiment of a hairpin 13 can be rotated relative to the second electrical conductor 7*b* by approximately 90° about the longitudinal axis 11 of the first electrical conductor 7*a*.

Alternatively or additionally, it would also be possible, as shown in the bottom illustration of FIG. 3, for the first electrical conductor 7*a* to have a screw-like contour that changes over its axial extension through the stator slot 5. This contour, which changes over the axial extension of the first electrical conductor 7*a*, is caused by a torsion of the electrical conductor 7*a* about its longitudinal axis 11.

The disclosure is not limited to the embodiments shown in the drawings. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

LIST OF REFERENCE SYMBOLS

1 Stator
3 Stator body
4 Stator teeth
5 Stator slots
6 Stator winding
7 Conductor
8 Slot base
9 Slot opening
10 Height
11 Longitudinal axis
12 Cooling fluid
14 First group
15 Second group
16 Hairpin winding
19 Width

The invention claimed is:

1. A stator for an electric machine, comprising a stator body with a plurality of stator teeth arranged over a periphery of the stator body in a distributed manner and stator slots formed between the stator teeth and extending in an axial direction through the stator body, a stator winding with a plurality of electrical conductors being arranged in the stator slots, and the stator slots along a radial extension thereof having a slot base at a radially outer end thereof and a slot opening at a radially inner end thereof, or the stator slots along the radial extension thereof having a slot base at the radially inner end thereof and a slot opening at the radially outer end thereof, and the electrical conductors of the stator winding having a width and a height in cross section, the width being greater than the height, and the electrical conductors being arranged in the stator slots such that the width thereof extends in a circumferential direction and the height thereof extends in the radial direction in the stator slots, and a cooling fluid being able to flow through at least one of the stator slots, wherein at least one of the electrical conductors is arranged in at least one of the stator slots through which the cooling fluid can flow such that at least in sections the width thereof extends in the radial direction and the height thereof extends in the circumferential direction in the corresponding stator slot; and wherein at least the one of the electrical conductors which is arranged in at least one of the stator slots such that the width extends in the radial direction and the height thereof extends in the circumferential direction in the corresponding stator slot is surrounded in the radial direction by electrical conductors, the width of each of which extends in the circumferential direction and the height of each of which extends in the radial direction in the stator slots.

2. The stator according to claim 1, wherein at least one of the plurality of the electrical conductors has a substantially rectangular contour in cross section.

3. The stator according to claim 1, wherein at least two of the plurality of the electrical conductors have a substantially identical contour in cross section.

4. The stator according to claim 1, wherein at least the one of the electrical conductors which is arranged in at least one of the stator slots such that the width thereof extends in the radial direction and the height thereof extends in the circumferential direction in the corresponding stator slot has a contour that changes over the axial extension thereof through the stator slot.

5. The stator according to claim 4, wherein the contour that changes over the axial extension through the stator slot is caused by a torsion of the electrical conductor about a longitudinal axis thereof.

6. The stator according to claim 1, wherein the electrical conductors have insulation on the outer lateral surfaces thereof.

7. The stator according to claim 1, wherein a ratio of the width to the height of an electrical conductor is between 1.01:1 and 1.5:1.

8. The stator according to claim 1, wherein in a plurality of the stator slots the electrical conductors are arranged in a substantially identical manner.

9. The stator according to claim 1, wherein an even number of a first group of electrical conductors is arranged in a plurality of the stator slots such that the width thereof extends in each case in the radial direction and the height thereof extends in each case in the circumferential direction in the corresponding stator slot, and an even number of a second group of electrical conductors is arranged in said plurality of stator slots such that the width thereof extends in each case in the circumferential direction and the height thereof extends in each case in the radial direction in the stator slots.

10. The stator according to claim 1, wherein the stator winding is configured as a hairpin winding.

11. The stator according to claim 10, wherein at least one hairpin of the hairpin winding has a first electrical conductor and a second electrical conductor parallel to the first electrical conductor with substantially identical cross-sectional contours, wherein the first electrical conductor is rotated with respect to the second electrical conductor at least once by approximately 90° about the longitudinal axis of the first electrical conductor.

12. An electric machine including a stator having a stator body with a plurality of stator teeth arranged over a periphery of the stator body in a distributed manner and stator slots formed between the stator teeth and extending in an axial direction through the stator body, a stator winding with a plurality of electrical conductors being arranged in the stator slots, and the stator slots along a radial extension thereof having a slot base at a radially outer end thereof and a slot opening at a radially inner end thereof, or the stator slots along the radial extension thereof having a slot base at the radially inner end thereof and a slot opening at the radially outer end thereof, and the electrical conductors of the stator winding having a width and a height in cross section, the width being greater than the height, and the electrical conductors being arranged in the stator slots such that the width thereof extends in a circumferential direction and the height thereof extends in the radial direction in the stator slots, and a cooling fluid being able to flow through at least one of the stator slots, wherein at least one of the electrical conductors is arranged in at least one of the stator slots through which the cooling fluid can flow such that at least in sections the width thereof extends in the radial direction and the height thereof extends in the circumferential direction in the corresponding stator slot, and wherein at least the one of the electrical conductors which is arranged in at least one of the stator slots such that the width extends in the radial direction and the height thereof extends in the circumferential direction in the corresponding stator slot is surrounded in the radial direction by electrical conductors, the width of each of which extends in the circumferential direction and the height of each of which extends in the radial direction in the stator slots.

13. The electric machine of according to claim 12, wherein at least one of the plurality of the electrical conductors has a substantially rectangular contour in cross section.

14. The electric machine of according to claim 12, wherein at least two of the plurality of the electrical conductors have a substantially identical contour in cross section.

15. The electric machine of according to claim 12 wherein at least the one of the electrical conductors which is arranged in at least one of the stator slots such that the width thereof extends in the radial direction and the height thereof extends in the circumferential direction in the corresponding stator slot has a contour that changes over the axial extension thereof through the stator slot.

16. The electric machine of according to claim 15 wherein the contour that changes over the axial extension through the stator slot is caused by a torsion of the electrical conductor about a longitudinal axis thereof.

17. The electric machine of according to claim 12, wherein the electrical conductors have insulation on outer lateral surfaces thereof.

18. The electric machine of according to claim 12, wherein a ratio of the width to the height of an electrical conductor is between 1.01:1 and 1.5:1.

* * * * *